United States Patent [19]
Scholl

[11] Patent Number: 5,990,462
[45] Date of Patent: Nov. 23, 1999

[54] WELDING COLLAR

[75] Inventor: Reinhold Scholl, Mannheim, Germany

[73] Assignee: Friatec Aktiengesellschaft, Mannheim, Germany

[21] Appl. No.: 09/201,879

[22] Filed: Nov. 30, 1998

[30] Foreign Application Priority Data

Nov. 28, 1997 [DE] Germany .......................... 197 52 910

[51] Int. Cl.[6] .................................................. H05B 3/58
[52] U.S. Cl. ............................................ 219/535; 264/248
[58] Field of Search ................................. 219/633, 621,
219/243, 535; 156/358, 64, 503, 253, 158;
285/104; 264/25, 248; 428/136

[56] References Cited

U.S. PATENT DOCUMENTS

| | | | |
|---|---|---|---|
| 4,436,987 | 3/1984 | Thalmann et al. | 219/535 |
| 4,440,038 | 4/1984 | Reich et al. | 219/535 |
| 4,670,207 | 6/1987 | Yamada et al. | |
| 4,684,417 | 8/1987 | Grandclement et al. | |
| 4,770,442 | 9/1988 | Sichler | 285/21 |
| 4,792,374 | 12/1988 | Rianda | 156/503 |
| 5,252,157 | 10/1993 | Inhofe, Jr. | 156/158 |
| 5,476,562 | 12/1995 | Inhofe, Jr. | 156/156 |

FOREIGN PATENT DOCUMENTS 195 19 341  6/1996  Germany .

*Primary Examiner*—Teresa Walberg
*Assistant Examiner*—Krishan Pasrija
*Attorney, Agent, or Firm*—Evenson, McKeown, Edwards & Lenahan, P.L.L.C.

[57] ABSTRACT

A welding collar contains a collar body of fusible plastic and a heater coil, disposed in its inside surface, which is spaced apart from a free collar end by a front zone. This welding collar is improved in that pipelines with ends which are not precisely cylindrical, and especially pipelines made from material in rolls, can be welded in a problem-free and reliable manner. The sum of the length of the front zone and the axial length of an inner zone adjoining the heater coil, with which the inserted pipe comes in contact, is at least approximately equal to the length of the heater coil. The insertion depth is greater by at least a factor of 1.4 than the inside diameter of the collar body.

29 Claims, 1 Drawing Sheet

WELDING COLLAR

BACKGROUND OF THE INVENTION

This invention relates to a welding collar of fusible plastic with a heater coil disposed on its inside surface.

A welding collar of this kind is disclosed in U.S. Pat. No. 4,906,613 and contains a heating coil or heater winding of electrically conductive wire in the area of its inner surface. This prior art welding collar is configured as a double collar in which ends of plastic pipes to be joined are introduced from both sides. After introduction of the pipe ends into the welding collar, a current is fed to the heater winding so that the plastic in the interior of the welding collar and the plastic of the outer surface of each pipe end are heated to produce a welded connection. Such welding collars can be configured both as double collars and also as components of fittings or comparable components in pipe lines.

Plastic pipes, in practice, often do not have an ideal axially elongated form, particularly when they are supplied in coils and, accordingly, are curved. When pipes taken from coils and other goods to be connected are welded by heater coil welding, due to the great inherent tensions resulting from the curvature of the pipe, a reliable weld can be assured only by additional aids such as straightening, stretching and holding devices. Also, inherent tensions and the stiffnesses of the pipes become greater as the ambient temperature decreases. Handling of the pipes and working with the pipes in pipe trenches become especially difficult under such conditions. The length of the prior art double collar is not much greater than the inside diameter or nominal size of the double collar. If one considers only the portion of the collar for welding one pipe end, that is, half of the double collar, then the length of this partial welding collar is substantially smaller than the nominal size.

A welding collar avoiding additional holding devices is disclosed in Japanese Patent 07-145,899 A. The welding collar has, in its interior, internal centering ribs tapering conically and extending axially. In the middle of its length, this welding collar, configured as a double collar, contains an annular abutment for the pipe ends. The centering ribs, which permit the pipe end to be gripped, are disposed between the annular abutment and the particular heater coil which is disposed at an axial distance. With internal centering ribs of this kind, the danger exists that the pipe ends will not be inserted all the way to the abutment, because the guiding ribs can limit the insertion movement. The manufacturing tolerances for the welding collar including the centering rings must be tight, inasmuch as the manufacture of the pipes is performed with comparatively great tolerances for practical and economic reasons. If the pipe end is not introduced all the way, then there is the danger of a faulty welded joint.

Furthermore, German Offenlegungsschrift DE 44 22 372 A1 discloses a method for welding plastic pipes and a collar for practicing the method. The collar, again, is a double collar and contains a spiral type heater winding extending over the entire length of the collar. In the middle part of the collar, in which the two pipe ends to be joined abut one another, the windings of the heater coil are closer together than they are in the areas of the heater coil adjoining the collar ends. This is done for the purpose of joining the abutting ends directly with a butt weld. The pipe ends are held by a special holding tool. For pipes of small diameters, the double collar can have additional projections near the two collar ends in order to be able to dispense with the holding device. The axial length of the projection is substantially smaller than the axial length of the heater coil or welding zone.

In German Utility Model No. DE U 296 19 861, a plastic welding collar is configured as a double collar for connecting two pipe ends and has special clamping devices at its two ends. The plastic collar body has axial slits in the areas of the clamping devices so that radial forces can be exerted by the clamping devices to hold the pipe ends. The operation of the clamping devices requires additional assembly work. If the clamping is inadequate, then the collar may not be properly secured to the pipe end.

Moreover, Japanese application JP 07-145,897 A teaches a welding collar which has projections extending radially inward at both collar ends and contacting the outer surface of the pipe. The projections are made quite thin in comparison to the wall thickness of the collar body and thus have a slight radial stiffness. The projections are said to achieve an axial hold, but radial equalization movements are possible and centering of the pipe end in the collar cannot be achieved.

SUMMARY OF THE INVENTION

The present invention, therefore, addresses the problem of improving a welding collar of the kind described such that pipelines, especially those drawn from coils, can be welded reliably. Inherent tensions due to pipe curvature or an axial offset between the pipe ends and the welding collar, therefore, have no disadvantageous effects on weld quality.

A solution to this problem is achieved by a particularly constructed welding collar including a collar body of fusible plastic having a free collar end, and a heater coil disposed at an inside surface of the collar body. The heater coil is spaced from the free collar end by a front zone and can be supplied with electric current so as to make a bond with at least one pipe of fusible plastic inserted into the collar body. A sum of an axial length of the front zone and an axial length of an inner zone adjoining the heater coil, with which the inserted pipe comes in contact, is at least approximately equal to an axial length of a weld zone defined by the heater coil. A pipe end insertion depth is greater by a factor of at least 1.4 than an inside diameter of the collar body.

The welding collar according to the invention has a functional design and contains a front guiding zone between the welding zone with the heater coil and the free end of the collar. According to the invention, the front zone and/or the inner zone axially adjoining the weld zone toward the collar bottom have a length such that the inserted pipe end is securely guided and supported during the welding procedure. The sum of the axial lengths of the front zone and the inner zone is at least equal in size, and preferably larger by a given factor, than the length of the weld zone or heater coil. Moreover, the depth of insertion of the pipe end is greater, at least by a factor of 1.4, than the inside diameter of the collar body. Preferably, this factor is 1.5. More preferably, this factor is 1.7. In the present invention, furthermore, the axial length of the front zone and of the inner zone is at least approximately the same as the axial length of the weld zone. Thus, even when curved pipe ends are present, relative movements of such pipe ends with respect to the welding collar are prevented. Such movements can lead to undesirable stresses or even short-circuiting of the heater coil when forces act in the heated plastic of the welding collar during welding which can lead to changes in the position or shape of the heater coil. The front zone (or the clamping or guiding zone) contains the cold zone area and is substantially longer than the cold zone necessary for welding. Due to an inward shift of the heater coil or weld zone, a clamping zone is present in the front area of the collar as well as in the middle area thereof. In a double collar configuration, two such inner zones adjoin one another in the center and are disposed together between the two heater coils. In the collar center, an abutment to limit the insertion movement of the pipe ends can be provided. Alternatively, the welding collar is configured as a slip-on collar such that an abutment for the pipe ends is not present in the middle or in the interior of the collar. The front clamping zone and the inner zone are extended so as to result in a guiding function, clamping, or both the guiding function and clamping on the inserted pipe end. Reception or support of the outer periphery of the pipe is made possible even in the presence of bent tube ends and the resultant tensions and reaction forces on the inside of the collar.

Due to the comparatively great length of both the clamping zone and the inner zone adjoining the heater coil in the interior, it is important to keep the welding zone free of tensions and to prevent displacement of the heater coil during melting or plastification of the plastic. Bent pipe ends disadvantageously exert local radial tensions on the heater coil in conventional short welding collars when there is an air gap of unacceptably large diameter or a contact pressure between an inner surface of the collar and an outside surface of the pipe is too low. As a result, short-circuits are created between adjacent turns and a defective or incomplete weld is produced.

Further developments and special embodiments of the invention are also described.

DESCRIPTION OF THE PREFERRED EMBODIMENT

Figure 1:
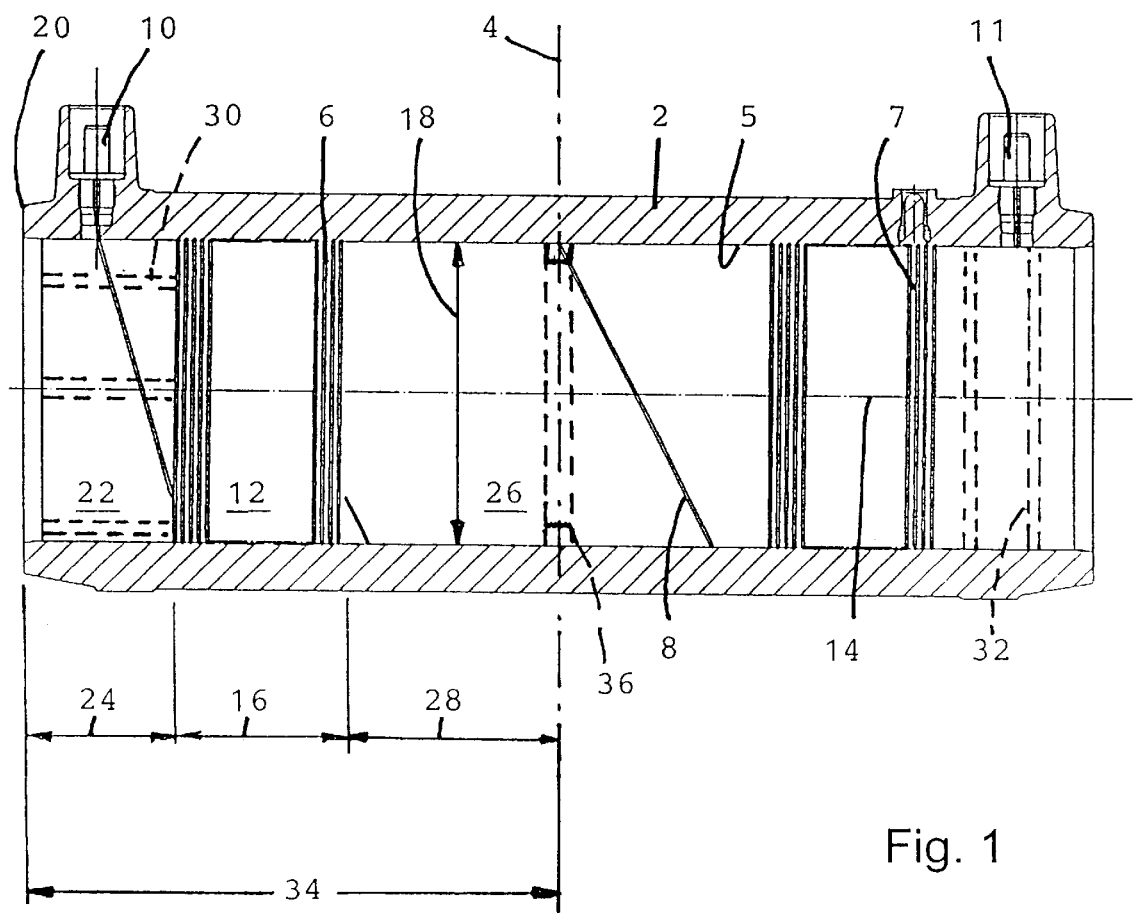
FIG. 1 is an axial section view of a welding collar according to the present invention.

The welding collar represented in an axial section in the drawing figure is a double collar and includes a collar body 2 of weldable or fusible thermoplastic material. The welding collar is best configured as a slip-on collar made substantially symmetrical with respect to a central plane 4 and contains heater coils or windings 6, 7. The inner surface 5 of the collar is continuous and substantially cylindrical. These two heater coils 6, 7 are wound in the left and right collar parts, respectively, as seen in the drawing and consist of the same continuous heater wire 8 with ends which are carried in a known manner to contacts 10 and 11. A cable and corresponding plug can electrically connect the contacts to a welding apparatus in order to deliver current in the necessary manner to the heater wire or coils 6, 7 to perform the welding operation. Explanations of the part of the welding collar on the left of the central plane 4 apply accordingly to the part of the welding collar on the right of the central plane 4.

The heater wire 8 is wound into a heater coil 6 to form the weld zone 12. This weld zone 12 has a length 16 in the direction of the longitudinal axis 14. The resistance of the welding wire, the distances between the individual turns of the heater coil, and the length 16 of the weld zone, among other things, are established according to particular requirements. Toward the front, free collar end 20, the heater coil 6 is adjoined by a front zone 22 with an axial length 24. The length 24 is substantially greater than a conventionally formed cold front zone. The front zone 22 is, according to the invention, designed as a gripping and guiding zone and contains the cold zone area. In the welding collar of the invention, the collar body is continuous over the circumference at the front zone of the collar body and has no radial slits. Furthermore, no substantial reduction in the wall thickness is provided. The length 24 of the front or gripping zone 22 is substantially the same as the axial length 16 of the welding zone 12 or heater coil 6.

Inside of the welding collar, between the heater coil 6 and the central plane 4, a comparatively long inner zone 26 with an axial length 28 is provided. The axial length 28 of the inner zone 26 is at least equal to the length 16 of the weld zone 12 and preferably is greater than the length 16 by a given factor. The weld zone is situated, according to the invention, axially between the front zone or gripping zone 22 and the inner zone 26. The factor mentioned above is defined by the ratio of the axial length 28 of the inner zone 26 to the axial length 16 of the weld zone 12, amounts to at least 1.1, and is desirably greater than 1.2. Advantageously, the factor ranges between 1.1 and 1.4.

The sum of the length 24 of the front zone and the length 28 of the inner zone 26 is, according to the invention, at least equal to the axial length 16 of the weld zone 12. The sum of the front and inner zone lengths 24 and 28 is preferably greater by a given factor than the length 16 of the weld zone. Expediently, this factor is at least 1.4. This factor is preferably at least 1.6 and even more preferably is greater than 1.8.

According to the invention, the sum of the length 24 of the front zone and the length 28 of the inner zone is at least approximately equal to the inside diameter 18 of the collar. Expediently, this sum is greater by a factor of at least 1.1 than the inside diameter 18. This sum is especially preferably 1.14 times greater than the inside diameter 18.

A ratio is defined by dividing the axial length 24 of the front zone 22 by the inside diameter 18 of the collar body 2. This ratio is greater than 0.35 and preferably ranges between 0.35 and 0.55. It has proven practical to establish this ratio in the range between 0.4 and 0.5.

It is appropriate to have the ratio formed by the axial length 28 of the inner zone 26 and the inside diameter 18 greater than 0.4. This ratio can be greater than 0.5, and preferably lies between 0.4 and 0.9. Even more preferably, this ratio is on the order of 0.6.

Due to the comparatively long front or gripping zone 22, especially in combination with the long inner zone 28, gripping or guidance of the pipe end inserted into the collar body 2 is achieved. Accommodation or support of an inserted bent pipe end is assured such that the weld zone remains tension-free and, during a phase in which the plastic is heated or plastified, any undesired shifting of the heater coil is avoided.

It is of particular importance to have the sum of the length 24 of the front zone 22 and the length 28 of the inner zone 26 be at least approximately of the same magnitude as the inside diameter 18. The ratio of the sum of these front and inner zone lengths 24 and 28 to the inside diameter 18 is greater than 0.8 and preferably ranges between 0.8 and 1.5. Advantageously, the ratio is between 1.0 and 1.3. These values are especially preferable for a welding collar with a nominal size or inside diameter 18 of 50 mm. As will be explained, for collars with other inside diameters, it is advantageous to provide correction factors for the values which are applicable to the special welding collar embodiment having a nominal size of 50 mm as is represented in the drawing and explained in the description.

In the front zone 22, axial guiding means, indicated in broken lines 30, are provided for the purpose of improving coaxial guidance and rounding of the pipe end. For the same reasons, means 32, running around the circumference of the collar, could be provided in the front zone 22 as is indicated in broken lines on the right side of the drawing. The means 32 are applicable configured as holding elements for axially fixing the inserted pipe end. Preferably, the holding elements 32 are configured as teeth with points such that the pipe end can be inserted easily into the collar but is prevented from undesired escape. The holding elements 32, when configured as teeth, are oriented so that the points of the teeth are inclined inwardly toward the inner zone 26 according to the invention.

The collar or double collar explained thus far with the aid of the drawing is configured as a slip-on collar which can be slipped unhampered over the pipe ends. Alternatively, the collar can have an abutment 36, preferably at the central plane 4, with which one pipe end or both pipe ends come in contact after insertion into the collar. The abutment 36 is preferably configured as a continuous circumferential projection which points radially from the inside surface 5 toward the longitudinal axis 14. If necessary, the abutment 36 can be configured as a plurality of individual projections or nubs distributed about the circumference.

In the welding collar according to the invention, the insertion depth 34 is substantially greater than the inside diameter 18. The insertion depth 34, according to the invention, is greater by a factor exceeding 1.4 than the inside diameter 18. This factor advantageously lies between 1.4 and 2, and especially advantageously lies between 1.5 and 1.9.

In the welding collar of the invention, it is of great importance to provide sufficiently long supporting and guiding zones outside of the weld zone 12 in the interior of the collar body. The reason for this is to keep the weld zone 12 as free as possible from forces and tensions during welding. It has been found that the total length of the front zone 22 and inner zone 26 in comparison to the length of the weld zone must be specified for the purpose of at least approximately obtaining functional coaxial alignment and guidance, at least approximately, even when the pipe ends, especially in the case of coiled pipe, are of shapes differing from an ideal geometry. The sum of the lengths 24 and 28 of the front zone 22 and of the inner zone 26 is advantageously substantially greater than the length 16 of the weld zone 12. The sum of the lengths 24 and 28 is preferably greater by a factor of more than 1.5 than the length of the weld zone. Advantageously, this factor is between 1.5 and 2.6, and preferably is between 1.8 and 2.3.

The dimensional data explained above pertain especially to a welding collar with an inside diameter 18 having a normal size of 50 mm. In this special embodiment, the length 24 of the front zone 22 is substantially 23 mm. Also, the length 16 of the weld zone 12 is at least approximately 26 mm. Lastly, the axial length 28 of the inner zone 26 is about 33 mm.

Furthermore, it has been found that in welding collars with greater inside diameters, length dimensions related by correction factors to the inside diameters can be advantageously reduced. Smaller inside diameters can be increased. The length data referred to above, and length data related to the diameter, apply a welding collar with an inside diameter of 50 mm. A correction factor of 0.67 is appropriate for a welding collar with an inside diameter of 110 mm. A correction factor of 0.5 is appropriate for an inside diameter of 200 mm. Also, for an inside diameter of 315 mm, a correction factor of 0.4 is to be provided, while for an inside diameter of 400 mm, a correction factor of 0.36 has proven practical. On the other hand, for a welding collar with an inside diameter smaller than 40 mm, the correction factor is 1.1. For an inside diameter of 32 mm, this correction factor is appropriately 1.2. The dimensional data explained above in connection with the embodiment are modified in accordance with to the inside diameters by the correction factors provided according to the invention.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A welding collar comprising:
    a collar body of fusible plastic having a free collar end, and
    a heater coil disposed at an inside surface of said collar body, said heater coil being spaced from the free collar end by a front zone,
    wherein said heater coil can be supplied with electric current so as to make a bond with at least one pipe of fusible plastic inserted into the collar body,
    wherein a sum of an axial length of the front zone and an axial length of an inner zone adjoining the heater coil, with which the inserted pipe comes in contact, is at least approximately equal to an axial length of a weld zone defined by the heater coil, and
    wherein an insertion depth is greater by a factor of at least 1.4 than an inside diameter of the collar body.

2. A welding collar according to claim 1, wherein the inner zone adjoining the heater coil has an axial length that is greater by a given factor than the axial length of the weld zone, said given factor being between 1.1 and 1.4.

3. A welding collar according to claim 1, wherein the insertion depth is greater by a factor of at least 1.5 than the inside diameter.

4. A welding collar according to claim 1, wherein a quotient formed from a sum of the length of the front zone and the axial length of the inner zone divided by the inside diameter is greater than 0.8.

5. A welding collar according to claim 1, wherein the axial length of the front zone is at least approximately the same as the axial length of the weld zone.

6. A welding collar according to claim 1, wherein a ratio of the axial length of the front zone to the inside diameter of the collar body is greater than 0.3.

7. A welding collar according to claim 2, wherein a sum of the axial length of the front zone and the axial length of the inner zone is substantially greater than the axial length of the weld zone.

8. A welding collar according to claim 2, wherein a ratio which is formed from the axial length of the inner zone with respect to the inside diameter is greater than 0.4.

9. A welding collar according to claim 1, and further comprising axial guides provided in the front zone for guidance of an end of the pipe.

10. A welding collar according to claim 1, wherein a total length of the front zone, the weld zone, and the inner zone is greater by a given factor of at least 1.3 than the inside diameter.

11. A welding collar according to claim 1, wherein the insertion depth is greater than the inside diameter by a factor between 1.4 and 2.

12. A welding collar according to claim 1, wherein the inside diameter is 50 mm, wherein for welding collars with inside diameters greater than 50 mm, a correction factor less than 1 is applied, and wherein for welding collars with inside diameters smaller than 50 mm, a correction factor greater than 1 is applied.

13. A welding collar according to claim 12, wherein when said inside diameter is 32 mm, the correction factor is 1.2, when said inside diameter is 40 mm, the correction factor is 1.1, when said inside diameter is 110 mm, the correction factor is 0.67, when said inside diameter is 200 mm, the correction factor is 0.5, when said inside diameter is 315 mm, the correction factor is 0.4, and when said inside diameter is 400 mm, the correction factor is 0.36.

14. A welding collar according to claim 2, wherein said given factor is between 1.2 and 1.3.

15. A welding collar according to claim 1, wherein the insertion depth is greater by a factor of at least 1.7 than said inside diameter.

16. A welding collar according to claim 4, wherein said quotient is between 0.8 and 1.5.

17. A welding collar according to claim 4, wherein said quotient is between 1.0 and 1.3.

18. A welding collar according to claim 1, wherein said front zone contains a cold zone required for welding and has an axial length substantially greater than said cold zone, whereby said front zone functions as a gripping and guiding zone for a pipe to be welded.

19. A welding collar according to claim 6, wherein said ratio ranges between 0.3 to 0.5.

20. A welding collar according to claim 6, wherein said ratio is in a range between 0.35 and 0.45.

21. A welding collar according to claim 7, wherein said sum is greater than the axial length by a factor of 1.5.

22. A welding collar according to claim 7, wherein said sum is greater than the axial length by a factor between 1.5 and 2.6.

23. A welding collar according to claim 7, wherein said sum is greater than the axial length by a factor between 1.8 and 2.3.

24. A welding collar according to claim 8, wherein said ratio is between 0.4 and 0.9.

25. A welding collar according to claim 8, wherein said ratio is between 0.5 and 0.8.

26. A welding collar according to claim 1, and further comprising holding elements running around an inner circumference of the collar which hold an end of the pipe.

27. A welding collar according to claim 10, wherein said given factor is at least 1.4.

28. A welding collar according to claim 10, wherein said given factor is between 1.3 and 1.6.

29. A welding collar according to claim 1, wherein the insertion depth is greater than the inside diameter by a factor of 1.5 to 1.9.

* * * * *